Figure 1:
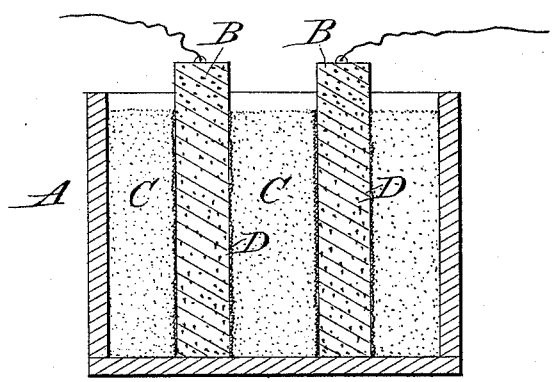

(No Model.)

W. A. SHAW.
SECONDARY BATTERY.

No. 397,443. Patented Feb. 5, 1889.

Attest:
H. H. Schott
Philip Mauro

Inventor:
Wm Anthony Shaw
by A. Pollok,
his attorney

N. PETERS, Photo-Lithographer, Washington, D. C.

United States Patent Office.

WILLIAM ANTHONY SHAW, OF BROOKLYN, ASSIGNOR TO THE ELECTRICAL ACCUMULATOR COMPANY, OF NEW YORK, N. Y.

SECONDARY BATTERY.

SPECIFICATION forming part of Letters Patent No. 397,443, dated February 5, 1889.

Original application filed April 14, 1882. Serial No. 58,313. Divided and this application filed September 28, 1882. Serial No. 72,901. (No model.)

*To all whom it may concern:*

Be it known that I, WILLIAM ANTHONY SHAW, of Brooklyn, in the county of Kings and State of New York, have invented a new and useful Improvement in Secondary Batteries, which improvement is fully set forth in the following specification.

This invention has reference to secondary or polarization batteries or electric accumulators for storing electrical energy; and it consists in a new method of making electrodes for such batteries, and in the improved electrodes themselves.

As heretofore ordinarily constructed, plates of lead have been used, plain or coated with an oxide or other compound of lead, which is porous or is adapted readily to become porous. The plain plates are "formed," as it is technically termed, by repeated charge and discharge of electricity—that is to say, by the action of electricity the metal is disintegrated to a certain depth and is thus brought into condition to be easily oxidized and deoxidized. A somewhat similar result is obtained in a quicker and better way by coating the plate with oxide or like material. The disintegrated or porous material is principally active in storing or conserving the electrical energy, and therefore it, or the substance adapted readily to be reduced to that condition, is herein called the "active material."

In the present invention the electrode is formed of a suitable support or base of metal or alloy or other conducting material, and the metallic oxide or other active material is distributed throughout its mass. The metal or other material forming the conducting base or support is heated to reduce it to a plastic or fluid state, and the active material is stirred therein. The mass is then cast into plates or other suitable forms, or it is cast into an ingot and rolled or otherwise made into shape. The conducting support or base is preferably made of galena (lead sulphide) and lead, and red lead is preferably employed as the active material. In the present invention other new features are also involved.

The following is a particular description of what is deemed the best mode of carrying the invention into effect: A mixture of lead and galena (lead sulphide) containing about two per cent. of galena is melted in a pot or receptacle of any suitable form. It is then allowed to cool till the mass becomes somewhat pasty. At this stage the red lead in any desired proportion is added and stirred in. The mass is then cast or molded into electrodes of any desired form or into ingots, which are then rolled or pressed out into electrodes. The electrodes may be of various forms—such as plain flat or curved plates, or corrugated, indented, or perforated plates. They may be used with or without a coating of active material; but usually it is more advantageous to apply a coating. Any of the various coatings may be used which are described, indicated, or suggested in my application for improvement in secondary batteries filed April 14, 1882, and serially numbered 58,313, of which the present application is a division and continuation. The coatings may also be applied in any of the ways set forth or referred to in said application.

In the manufacture of the electrodes in accordance with this invention it is not necessary to employ galena. Metallic lead may be melted and the red lead stirred in. Neither is it necessary to employ the galena in the mixture in the proportion indicated, since the same may be increased or diminished. In fact, the lead may be omitted entirely. Instead of using lead or galena, or both, an alloy of lead may be used. So, also, instead of red lead other oxide or compound may be used. The electrodes also may have the base or support and the active material which is distributed throughout the same either or both of suitable material other than lead or lead compound. Electrodes having a base or support of galena and galena and lead could be made in any ordinary or suitable way.

Figure 2:
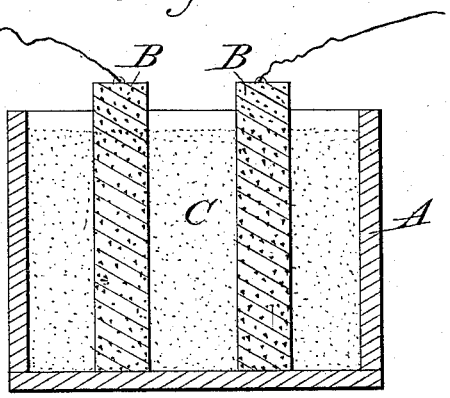

The accompanying drawings represent in vertical section a form of secondary battery to which the invention is applicable, the electrodes in Figure 1 being provided with, and in Fig. 2 being without, an applied coating of active material.

A is the casing or box of any suitable non-conducting material—such as glass, hard rubber, (vulcanite,) wood, or the like.

B is the body of the electrodes, made as above described; C, a porous filling of inert material—say of sand or the like—with or without soluble salts in a solid form mixed therewith, and D, Fig. 1, the applied active material. The active material D is most advantageously formed of bichromate of lead with one-fourth part (more or less) of its weight of bichromate of potash made into a paste with sulphuric acid and water, (ten per cent. solution,) and applied with a spatula or otherwise. The potash-salt may be omitted, although its presence is advantageous. The porous filling material, which contains or may contain nitrate of potash or other soluble salt—a chromate, for example—mixed with the inert granular or pulverulent non-conducting material—say with earth, sand, crushed glass, and the like—is moistened with water, dilute acid, or other liquid, but preferably with a solution of bichromate of potash in dilute sulphuric acid.

Having now fully described my said invention and the manner of carrying the same into effect, what I claim is—

1. The method of making electrodes for secondary batteries by melting or softening by heat a suitable metal or metallic compound, mixing active material therewith, and allowing the mass to harden, substantially as described.

2. The method of making electrodes for secondary batteries by mixing active material with molten or plastic metal or metallic compound and casting the mixture, substantially as described.

3. The method of making electrodes for secondary batteries by mixing active material with molten or plastic metal or metallic compound, casting the mixture into the form of an electrode, and applying to the surface thereof a coating of a suitable active material, substantially as described.

4. The method of making electrodes for secondary batteries by melting or softening by heat a suitable metal or metallic compound, combining active material therewith, and allowing the mass to harden.

5. An electrode for secondary batteries having a conducting-support containing galena, substantially as described.

6. An electrode for secondary batteries, consisting of lead, combined with galena, and having active material distributed throughout its mass, substantially as described.

7. An electrode for secondary batteries, comprising a suitable conducting-support, and an active coating containing a chromium compound, substantially as described.

8. An element or electrode for secondary batteries, comprising a conducting-support, such as described, and an active coating comprising a mixture of chromate of lead and bichromate of potash, substantially as described.

In testimony whereof I have signed this specification in the presence of two subscribing witnesses.

WM. ANTHONY SHAW.

Witnesses:
C. J. HEDRICK,
H. B. ZEVELY.